United States Patent
Bae et al.

(10) Patent No.: US 9,682,865 B2
(45) Date of Patent: Jun. 20, 2017

(54) ACTIVE CARBON AND METHOD FOR PREPARATION OF THE SAME

(71) Applicants: Hyundai Motor Company, Seoul (KR); Kia Motors Corporation, Seoul (KR); INHA—INDUSTRY PARTNERSHIP INSTITUTE, Incheon (KR)

(72) Inventors: Shin-Tae Bae, Hwaseong-Si (KR); Seul-Yi Lee, Incheon (KR); Young-Jung Heo, Chungcheongbuk-do (KR); Soo-Jin Park, Seoul (KR)

(73) Assignees: Hyundai Motor Company, Seoul (KR); Kia Motors Corporation, Seoul (KR); INHA-INDUSTRY PARTNERSHIP INSTITUTE, Incheon (KR)

( * ) Notice: Subject to any disclaimer, the term of this patent is extended or adjusted under 35 U.S.C. 154(b) by 191 days.

(21) Appl. No.: 14/666,518

(22) Filed: Mar. 24, 2015

(65) Prior Publication Data
US 2016/0115116 A1    Apr. 28, 2016

(30) Foreign Application Priority Data
Oct. 27, 2014    (KR) .......................... 10-2014-0145823

(51) Int. Cl.
C01B 31/14    (2006.01)
C01B 31/08    (2006.01)
C01B 31/10    (2006.01)

(52) U.S. Cl.
CPC ............ *C01B 31/14* (2013.01); *C01B 31/081* (2013.01); *C01B 31/086* (2013.01); *C01B 31/10* (2013.01)

(58) Field of Classification Search
CPC ....... C01B 31/081; C01B 31/14; C01B 31/10; C01B 31/086; Y10T 428/2982
USPC .......................................... 428/402; 564/485
See application file for complete search history.

(56) References Cited

U.S. PATENT DOCUMENTS

| 6,114,280 A | 9/2000 | Stephens | |
|---|---|---|---|
| 7,465,429 B2* | 12/2008 | Mochida | B01D 53/8628 422/169 |
| 7,629,285 B2* | 12/2009 | Popov | B01J 21/18 502/150 |
| 8,795,410 B2* | 8/2014 | Sato | B01J 20/3204 210/660 |
| 2009/0220767 A1* | 9/2009 | Schlogl | B01J 21/18 428/323 |
| 2013/0335883 A1* | 12/2013 | Soneda | H01G 11/38 361/502 |
| 2015/0374743 A1* | 12/2015 | Sonobe | A61K 45/06 424/489 |

FOREIGN PATENT DOCUMENTS

| JP | H09-500572 A | 1/1997 |
|---|---|---|
| JP | 2013-161835 A | 8/2013 |
| KR | 10-1997-0002890 | 3/1997 |
| KR | 10-2013-0021735 A | 3/2013 |
| KR | 2013-0118007 A | 10/2013 |
| KR | 10-2013-0122332 A | 11/2013 |
| KR | 10-1358753 B1 | 2/2014 |

* cited by examiner

*Primary Examiner* — Leszek Kiliman
(74) *Attorney, Agent, or Firm* — Mintz Levin Cohn Ferris Glovsky and Popeo, P.C.; Peter F. Corless

(57) ABSTRACT

Disclosed is an active carbon that includes micropores having a diameter of about 0.5 nm to about 0.8 nm in a content of about 70 vol % to about 90 vol % based on the total volume of the total pores, and has a nitrogen-containing functional group introduced on the surface thereof.
Moreover, disclosed is a method for preparing active carbon. The method may include steps of: forming a reaction mixture including a carbon precursor, an alkali salt, and an organic compound including a nitrogen-containing functional group; and heating the reaction mixture to a temperature of about 800° C. to about 1000° C. in the presence of nitrogen gas.

19 Claims, 1 Drawing Sheet

ACTIVE CARBON AND METHOD FOR PREPARATION OF THE SAME

CROSS-REFERENCE TO RELATED APPLICATION

This application claims the benefit of priority to Korean Patent Application No. 10-2014-0145823 filed in the Korean Intellectual Property Office on Oct. 27, 2014, the entire contents of which are incorporated herein by reference.

TECHNICAL FIELD

The present invention relates to an active carbon and a method for preparing the same. Particularly, the active carbon may have a uniform particle size and contain a substantial quantity of micropores, thereby having high specific surface area. As such, the active carbon may have an increased carbon dioxide adsorption. Further, the method for preparing the active carbon having improved selective adsorption of carbon dioxide and size uniformity of micropores may use low-cost raw materials with a high yield by a simple process.

BACKGROUND

Recently, as interest in green vehicles has been increased due to the problems such as fossil fuel exhaustion, greenhouse gas discharge, and the like, studies on electronic vehicles have been actively conducted.

Particularly, electronic vehicles, when air conditioned or heated, separately require a PTC (positive temperature coefficient) heater and coolant compression power because they do not have waste heat (engine cooling water) for heating and engine power for compression of an air conditioning coolant, unlike internal combustion engine vehicles, and thus additional power is consumed and a driving range may be reduced by about 30% to about 50%.

Thus, in order to prevent a reduction of the driving range, a method of maximally blocking introduction of external air so as to conserve internal air of air conditioned/heated vehicles has been suggested. However, in this case, carbon dioxide concentration in the vehicle may increase due to carbon dioxide discharged by passengers, and thus safety problems may appear seriously during driving the vehicles.

In order to solve this problem, an active carbon that can adsorb carbon dioxide has been developed so as to control the amount of carbon dioxide in the vehicles.

Active carbon is carbon that may be prepared to have strong adsorptivity, and it may have strong adsorptivity through substantial specific surface area.

However, selective adsorption of carbon dioxide in the air may not be obtained, and pore size distribution in the active carbon may be too broad and thus adsorption capacity may not be consistent.

Accordingly, there is a demand for development of such active carbon that may include substantial quantities of uniform micropores, selectively adsorb carbon dioxide, and have a uniform particle size.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides an active carbon that may have a uniform particle size and contains a substantial quantity of micropores, thereby providing a high specific surface area. Further, the active carbon may have an increased carbon dioxide adsorption amount.

In one aspect of the present invention, an active carbon is provided.

In an exemplary embodiment, the active carbon may comprise micropores having a diameter of about 0.5 nm to about 0.8 nm in a content of about 70 vol % to about 90 vol % of total pores. In particular, the active carbon may have a nitrogen-containing functional group introduced on the surface thereof.

A volume of the total pores may be from about 2.000 cm$^3$/g to about 2.500 cm$^3$/g.

The active carbon may have a diameter of about 0.01 μm to about 0.9 μm. Moreover, the active carbon having a diameter of about 0.1 μm to about 0.5 μm may be included in a content of 70 number % to 90 number % of the total number of the active carbon having a diameter of about 0.01 μm to about 0.9 μm.

The active carbon may have a specific surface area of about 3000 m$^2$/g to about 4000 m$^2$/g.

The active carbon may have a mean carbon dioxide adsorption amount of about 20 mg/g to about 300 mg/g.

The nitrogen-containing functional group may include at least one selected from the group consisting of a $C_{1-20}$ alkyl group substituted with at least one amino group, a $C_{3-20}$ cycloalkyl group substituted with at least one amino group, and a $C_{6-20}$ aryl group substituted with at least one amino group. The introduction of the nitrogen-containing functional group on the surface of the active carbon may be mediated by at least one functional group selected from the group consisting of a functional group of the following Chemical Formula 1, an ether functional group, and a thioether functional group,

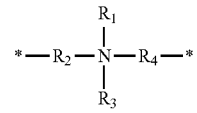

[Chemical Formula 1]

where, in Chemical Formula 1, $R_1$ and $R_3$ are identical or different, and are independently hydrogen or a linear or branched $C_{1-10}$ alkyl group; and $R_2$ and $R_4$ are identical or different, and are independently a bond or a linear or branched $C_{1-10}$ alkylene group. Particularly, the content of the nitrogen in the nitrogen-containing functional group may be from about 3 wt % to 10 wt %, based on the total weight of active carbon.

In another aspect of the present invention, provided is a method for preparing the active carbon having improved selective adsorption of carbon dioxide and size uniformity of micropores. The method may use low-cost raw materials to provide the active carbon with a high yield by a simple process.

In an exemplary embodiment, the method may comprise steps of: forming a reaction mixture comprising a carbon precursor, an alkali salt, and an organic compound including a nitrogen-containing functional group; and heating the reaction mixture to a temperature of about 800° C. to about 1000° C. in the presence of nitrogen gas.

A weight ratio of the alkali salt and the organic compound including a nitrogen-containing functional group may be from about 1:1.5 to about 1:5. In addition, a weight ratio of the carbon precursor and the alkali salt may be from about 1:1.5 to about 1:2.5. Moreover, a weight ratio of the carbon precursor and the organic compound including a nitrogen-containing functional group may be from about 1:2 to about 1:10.

The step of forming the reaction mixture may be performed at an ambient temperature and an ambient pressure. In particular, when the reaction mixture is formed, the carbon precursor may include at least one selected from the group consisting of rice husks, coconut shells, tangerine peels, orange peels, exhausted coffee, and bamboo stems. Further, the alkali salt may include at least one selected from the group consisting of potassium hydroxide, sodium hydroxide, and calcium hydroxide.

The method may further comprise a step of pulverizing the carbon precursor before the step of forming the reaction mixture.

The step of heating the reaction mixture may be performed for about 30 minutes to about 100 minutes.

Further provided are apparatuses that comprise the active carbon as described herein. Still further provided are resin molded products that comprise the active carbon as described herein.

Other aspects of the invention are disclosed infra.

BRIEF DESCRIPTION OF THE DRAWINGS

The above and other objects, features and advantages of the present invention will be more clearly understood from the following detailed description taken in conjunction with the accompanying drawing, in which.

DETAILED DESCRIPTION

Figure 1:
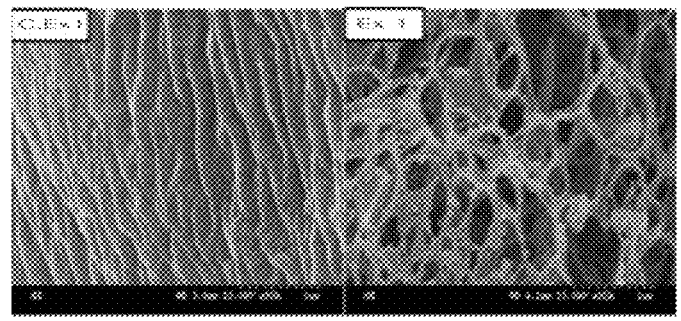
FIG. 1 shows exemplary SEM images of an exemplary active carbon prepared in Example 1 according to an exemplary embodiment of the present invention and an active carbon prepared in Comparative Example 1 in the related art.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, regions, integers, steps, operations, elements and/or components but do not preclude the presence or addition of one or more other features, regions, integers, steps, operations, elements, components, and/or combinations thereof.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In one aspect of the present invention, provided is an active carbon that may include micropores having a diameter of about 0.5 nm to about 0.8 nm in a content of 70 vol % to 90 vol % based on the total volume of the total pores.

The active carbon may have a nitrogen-containing functional group introduced on the surface thereof.

Further, in another aspect of the present invention, provided is a method for preparing active carbon that may include steps of: forming a reaction mixture including a carbon precursor, an alkali salt, and an organic compound including a nitrogen-containing functional group; and heating the reaction mixture to a temperature of about 800° C. to about 1000° C. in the presence of nitrogen gas.

Hereinafter, active carbon and a method for preparation thereof according to specific embodiments of the invention will be explained.

According to an exemplary embodiment of the present invention, the active carbon may include micropores having a diameter of about 0.5 nm to about 0.8 nm in a content of about 70 vol % to about 90 vol % of the total pores. The active carbon may have a nitrogen-containing functional group introduced on the surface.

The inventors of the present invention have confirmed through experiments that when the above-explained specific active carbon is used, since it contains a large quantity of micropores and thus has a high specific surface area, an adsorption amount may be increased, and a nitrogen-containing functional group may be introduced to improve selective adsorption of carbon dioxide through an electron donor/acceptor reaction (acid/base reaction), and further, since it has a uniform particle size, suitable processing may be obtained.

Examples of the shape and diameter of the pores included in the active carbon may not be specifically limited, and may be classified into micropores, mesopores, and macropores according to the diameter. The micropore has a diameter of about 0.5 to about 0.8 nm. The mesopore has a diameter of about 2 nm to about 50 nm. The macropore has a diameter of about more than 50 nm.

Particularly, the active carbon may include micropores having a diameter of about 0.5 nm and about 0.8 nm in a content of about 70 vol % to about 90 vol %, or particularly of about 74 vol % to about 80 vol %, based on the total volume of the total pores.

In other words, among the total pores distributed in the active carbon, the micropores having a diameter of about 0.5 nm to about 0.8 nm may be included in a content of about 70 vol % to about 90 vol %, or particularly, of about 74 vol % to about 80 vol %.

When the content of the micropores is less than about 70 vol % of the total pores, the size of pores formed in the active carbon may not be regularly distributed, substantial content of the mesopores may be included, and pore size distribution may be broadened, and thus carbon dioxide adsorption capacity may not be consistent.

The volume of the total pores may be from about 2.000 $cm^3/g$ to about 2.500 $cm^3/g$, from about 2.050 $cm^3/g$ to about 2.400 $cm^3/g$, or particularly from about 2.100 $cm^3/g$ to about 2.200 $cm^3/g$. As used herein, the volume of the total pores means a sum of the volumes of the total pores included in the active carbon of unit mass.

For example, the pores may include micropores, mesopores, and macropores.

When the volume of the total pores is less than about 2.000 $cm^3/g$, the active carbon may not have a sufficient surface area, and adsorption capacity may be reduced.

The active carbon may have a diameter of about 0.01 μm to about 0.9 μm, or particularly of about 0.05 μm to about 0.8 μm.

Further, the active carbon having a diameter of about 0.1 μm to about 0.5 μm may be included in the active carbon having a diameter of about 0.01 µm to about 0.9 µm in a content of about 70 number % to about 90 number %, or particularly of about 75 number % to about 88 number %.

Figure 2:
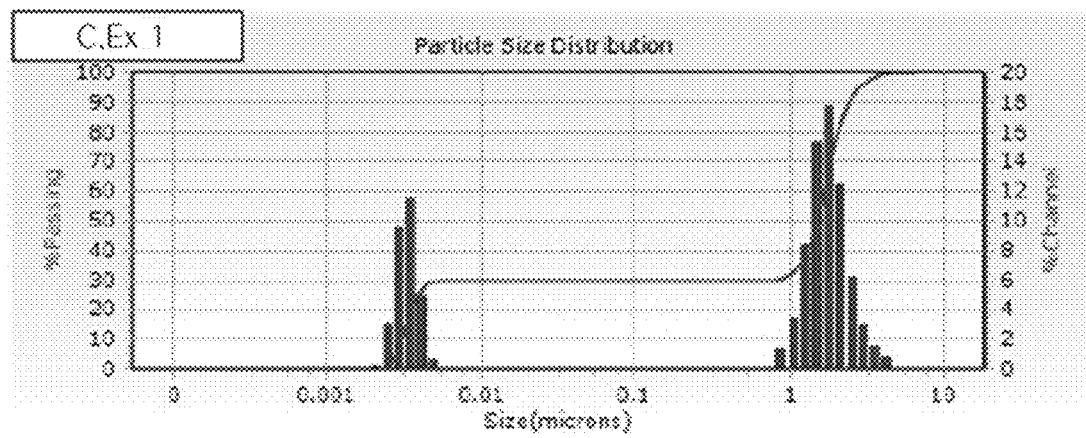
FIG. 2 shows exemplary particle size distributions of an exemplary active carbon prepared in Example 1 according to an exemplary embodiment of the present invention and an active carbon prepared in Comparative Example 1 in the related art.
Figure 2:
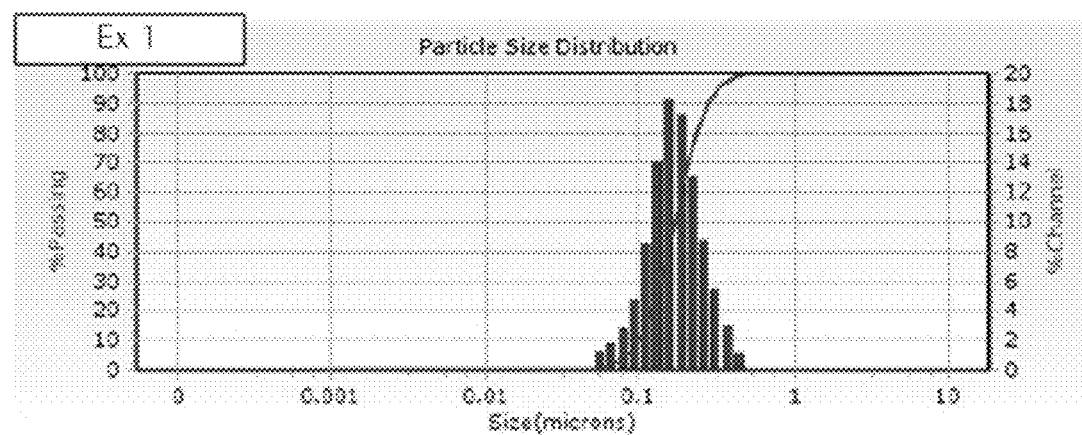

Particularly, the diameter distribution of the active carbon may form a normal distribution within a range of about 0.01 µm to about 0.9 µm, as shown in FIG. 2.

As such, as the diameter of the active carbon appears uniform within a narrow range, when the active carbon is applied for a product, moldability may be improved and performance may be substantially improved.

In addition, a nitrogen-containing functional group may be introduced on the surface of the active carbon.

As a nitrogen-containing functional group is introduced on the surface of the active carbon, the nitrogen-containing functional group may serve as a carbon dioxide-philic active site, and selectively introduce carbon dioxide into pores, thus rapidly inducing adsorption.

The active carbon surface may include all the surfaces on which the active carbon contacts external air, and it may include a surface on which the pores included in the active carbon contact external air.

The nitrogen-containing functional group means all the functional groups including at least one nitrogen atom.

In particular, the nitrogen-containing functional group may include at least one selected from the group consisting of a $C_{1-20}$ alkyl group substituted with at least one amino group, a $C_{3-20}$ cycloalkyl group substituted with at least one amino group, and a $C_{6-20}$ aryl group substituted with at least one amino group, and particularly a $C_{1-20}$ alkyl group substituted with at least one amino group may be used.

The alkyl group may be a linear or branched saturated monovalent hydrocarbon moiety having 1 to 20, or 1 to 10, or 1 to 6 carbon atoms.

The alkyl group may include those substituted with a specific substituent described below, as well as those unsubstituted.

The alkyl group is not specifically limited, but for example, it may include methyl, ethyl, propyl, 2-propyl, n-butyl, iso-butyl, tert-butyl, pentyl, hexyl, dodecyl, fluoromethyl, difluoromethyl, trifluoromethyl, chloromethyl, dichloromethyl, trichloromethyl, iodomethyl, bromomethyl, and the like.

The cycloalkyl group means a saturated or unsaturated non-aromatic monovalent monocyclic, bicyclic, or tricyclic hydrocarbon moiety of 3 to 20, or 3 to 12 cyclic carbons, which may be unsubstituted or substituted with a specific substituent described below.

For example, it may include cyclopropyl, cyclobutyl, cyclopentyl, cyclopentenyl, cyclohexyl, cyclohexenyl, cycloheptyl, cyclooctyl, decahydronaphthalenyl, adamantly, norbornyl (i.e., [2,2,2]hept-5-enyl), and the like.

The aryl group means a monovalent monocyclic, bicyclic, or tricyclic aromatic hydrocarbon moiety having 6 to 20, or 6 to 12 ring atoms, which may be unsubstituted or substituted with a specific substituent described below.

Examples of the aryl group may include phenyl, naphthalenyl, fluorenyl and the like.

The description that the above-explained substituents are 'substituted or unsubstituted' means to include those substituted with a specific substituent as well as each substituent itself.

Unless otherwise indicated herein, examples of the substituents with which each substituent can be further substituted may include halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, siloxy, or oxygen, nitrogen, sulfur, silicon, or boron-containing polar functional groups, and the like.

The above-described alkyl group, cycloalkyl group, or aryl group may be substituted with 1 or more, or 1 to 5 amino groups.

The amino group means a functional group wherein one hydrogen atom is removed from ammonia containing one nitrogen and 3 hydrogen atoms.

The position at which the amino group is substituted is not specifically limited, and it may be substituted at all the carbon atoms included in the alkyl group, cycloalkyl group, or aryl group.

The $C_{1-20}$ alkyl group substituted with at least one amino group is not specifically limited, but for example, it may include a $C_{1-10}$ alkyl group substituted with one amino group, and particularly an ethyl group substituted with one amino group at the end.

The introduction of the nitrogen-containing functional group on the surface of the active carbon may be mediated by at least one functional group selected from the group consisting of a functional group of the following Chemical Formula 1, an ether functional group and a thioether functional group.

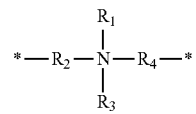

[Chemical Formula 1]

In Chemical Formula 1, $R_1$ and $R_3$ may be identical or different, and may be independently hydrogen or a linear or branched $C_{1-10}$ alkyl group, and each may be hydrogen. $R_2$ and $R_4$ may be identical or different, and may be independently a bond or a linear or branched $C_{1-10}$ alkylene group, and each may be a bond.

Although the examples of the linear or branched $C_{1-10}$ alkylene group are not specifically limited, for example, a methylene group or an ethylene group may be used.

The ether functional group may include a functional group of the following Chemical Formula 2.

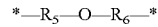

[Chemical Formula 2]

In Chemical Formula 2, $R_5$ and $R_6$ may be identical or different, and may be independently a bond or a linear or branched $C_{1-10}$ alkylene group.

Although the examples of the linear or branched $C_{1-10}$ alkylene group are not specifically limited, for example, a methylene group or an ethylene group may be used.

Further, the thioether functional group may include a functional group of the following Chemical Formula 3.

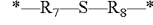

[Chemical Formula 3]

In Chemical Formula 3, $R_7$ and $R_8$ may be identical or different, and may be independently a bond or a linear or branched $C_{1-10}$ alkylene group.

Although the examples of the linear or branched $C_{1-10}$ alkylene group are not specifically limited, for example, a methylene group or an ethylene group may be used.

The content of nitrogen included in the nitrogen-containing functional group may be from about 3 wt % to about 10 wt %, from about 4 wt % to about 6 wt %, or particularly from about 4.5 wt % to about 5 wt %, based on the weight of the active carbon.

When the content of nitrogen included in the nitrogen-containing functional group is substantially reduced to less than about 3 wt % based on the weight of the active carbon, carbon dioxide selective adsorptivity of the active carbon may be reduced.

When content of nitrogen included in the nitrogen-containing functional group is greater than about 10 wt % based on the weight of the active carbon, micropores in the active carbon may be blocked or the pore wall may collapse, thus the reduced micropores may influence carbon dioxide adsorption.

The active carbon may have a specific surface area of about 3000 $m^2/g$ to about 4000 $m^2/g$, of about 3200 $m^2/g$ to about 3800 $m^2/g$, or particularly of about 3400 $m^2/g$ to about 3500 $m^2/g$. As used herein, the specific surface area means surface area of unit mass.

When the specific surface area of the active carbon is substantially decreased to less than about 3000 $m^2/g$, adsorptivity of the active carbon may be remarkably decreased.

Specifically, a mean carbon dioxide adsorption amount of the active carbon may be from about 20 mg/g to about 300 mg/g, from about 23 mg/g to about 200 mg/g, or particularly from about 24 mg/g to about 50 mg/g.

The active carbon may be used as a water purifier filter, an air conditioner filter for vehicles, a supercapacitor electrode, and the like. Alternatively, the active carbon itself may be used, or it may be combined with a binder resin and used in the form of a resin molded product. When it is used in the form of a resin molded product, it may be used in the form of pellets or granules.

According to another aspect of the invention, a method for preparing active carbon is provided.

In an exemplary embodiment, the method may include steps of: forming a reaction mixture including a carbon precursor, an alkali salt, and an organic compound including a nitrogen-containing functional group; and heating the reaction mixture to a temperature of about 800° C. to about 1000° C. in the presence of nitrogen gas, is provided.

The inventors of the present invention have confirmed through experiments that when the above-explained preparation method of active carbon is used, production cost may be reduced because an inexpensive carbon precursor is used, and large quantities of micropores may be formed by a simple process of mixing a carbon precursor, an alkali salt, and an organic compound including a nitrogen-containing functional group, and heating the mixture, and further active carbon having improved selective adsorptivity of carbon dioxide may be prepared with a high yield, and completed the invention.

In particular, the weight ratio of the alkali salt and the organic compound including a nitrogen-containing functional group may be from about 1:1.5 to about 1:5, from about 1:1.8 to about 1:3, or particularly from about 1:2.0 to about 1:2.5.

By mixing the alkali salt and the organic compound including a nitrogen-containing functional group, the organic compound including a nitrogen-containing functional group may be bonded to the surface of the active carbon through one-step process.

When the weight ratio of the alkali salt and the organic compound including a nitrogen-containing functional group is less than about 1:1.5, the organic compound including a nitrogen-containing functional group may not be sufficiently bonded, and when the weight ratio of the alkali salt and the organic compound including a nitrogen-containing functional group is greater than about 1:5, the organic compound including a nitrogen-containing functional group may be excessively bonded thereby reducing the specific surface area of the active carbon.

The weight ratio of the carbon precursor and the alkali salt may be from about 1:1.5 to about 1:2.5, from about 1:1.8 to about 1:2.2, or particularly from about 1:1.9 to about 1:2.1.

By mixing the carbon precursor and the alkali salt as the mixture is heated, the alkali salt included in the carbon precursor may be vaporized and removed, and the sites at which the alkali salt existed may remain as pores, thus forming pores inside of the active carbon.

When the weight ratio of the carbon precursor and the alkali salt is greater than about 1:2.5, due to the excessive alkali salt, the carbon precursor may excessively collapse by the reaction of the carbon precursor and the alkali salt, and thus mesopores may be predominant over micropores, production yield may decrease and environmental pollution may be generated.

When the weight ratio of the carbon precursor and the alkali salt is less than about 1:1.5, the amount of the alkali salt that reacts with the carbon precursor may be substantially reduced, such that micropores may not be formed to the maximum.

The weight ratio of the carbon precursor and the organic compound including a nitrogen-containing functional group may be from about 1:2 to about 1:10, from about 1:3 to about 1:8, or particularly from about 1:4 to about 1:5.

By mixing the carbon precursor and the organic compound including a nitrogen-containing functional group, the organic compound including a nitrogen-containing functional group may be introduced on the surface of the active carbon, simultaneously with the formation of pores in the heat treatment process.

When the weight ratio of the carbon precursor and the organic compound including a nitrogen-containing functional group is greater than about 1:10, formation of micropores of the active carbon may be inhibited.

When the weight ratio of the carbon precursor and the organic compound including a nitrogen-containing functional group is less than about 1:2, due to a decrease in the content of the organic compounds including a nitrogen-containing functional group that are bonded on the surface of the active carbon, carbon dioxide adsorptivity of the active carbon may decrease.

The step of forming a reaction mixture including the carbon precursor, the alkali salt, and the organic compound including a nitrogen-containing functional group may be performed at ambient temperature and ambient pressure.

The ambient temperature may refer to an air temperature of about 20° C. to about 30° C., and the ambient pressure may refer to atmospheric pressure.

Since the step of forming a reaction mixture including the carbon precursor, the alkali salt, and the organic compound including the nitrogen-containing functional group is performed at ambient temperature and ambient pressure, the reaction mixture may be sufficiently mixed before being heated, and the total process may be simplified.

As the carbon precursor, rice husks, coconut shells, tangerine peels, orange peels, exhausted coffee, bamboo stems, or a mixture thereof may be used. The carbon precursor may be obtained from plants such as rice, coconut, tangerine, orange, coffee, bamboo, and the like, and those containing carbon components may be used without specific limitation. For example, rice husk may be used, and the rice husk may be used without heat treatment.

Since the carbon precursor is commonly available, the use of the carbon precursor may reduce production cost of active carbon.

The alkali salt may include potassium hydroxide, sodium hydroxide, and calcium hydroxide, or a mixture thereof. As used herein, the alkali salt means a compound of which aqueous solution includes an alkali metal, and the size and the specific area of formed pores may be changed according to the kind of alkali metal.

Although the examples of the organic compound including a nitrogen-containing functional group are not specifically limited, for example, it may include an amine compound.

As described above, by using the organic compound including a nitrogen-containing functional group, the nitrogen-containing functional group may be introduced on the surface of the active carbon, and the nitrogen-containing functional group may serve as a carbon dioxide-philic adsorption site that induces adsorption of carbon dioxide gas, thus improving carbon dioxide selective adsorptivity of the active carbon.

Although the examples of the amine compound are not specifically limited, for example, monoethanolamine (MEA), diethanolamine (DEA), triethanolamine, ethylenediamine, and the like may be used, and preferably, ethylenediamine may be used.

The reaction mixture formed by mixing a carbon precursor, an alkali salt, and an organic compound including a nitrogen-containing functional group may further include a solvent.

Although the examples of the solvent are not specifically limited, for example, distilled water, methanol, ethanol, or a mixture thereof may be used, and preferably, a mixed solvent of distilled water and ethanol in a volume ratio of about 1:1 may be used. The amount of the solvent is also not specifically limited, and for example, it may be used in an amount of about 20 ml to about 100 ml.

The method may further include, before the step of forming the reaction mixture, a step of pulverizing the carbon precursor.

In the step of pulverizing a carbon precursor, high quality active carbon that has a uniform particle size and is free of impurities may be prepared.

In particular, in the step of pulverizing a carbon precursor, although the method of pulverizing a carbon precursor is not specifically limited, for example, a ball mill pulverization method may be used.

For example, the ball mill pulverization method may include mixing zirconia having a diameter of about 1 mm to about 20 mm with a carbon precursor at a ratio of about 10:1 to about 1000:1, and pulverizing the mixture at about 100 to about 500 rpm for about 30 minutes to about 5 hours.

After the step of pulverizing the carbon precursor, the method may further include a step of treating the pulverized carbon precursor with an acidic solution.

In the step of treating the pulverized carbon precursor with the acidic solution, although the examples of the acidic solution are not specifically limited, for example, a hydrofluoric acid solution of a about 1% to about 10% concentration or a hydrochloric acid solution of a about 0.1 M to about 2 M concentration and the like may be used.

By treating the pulverized carbon precursor with an acidic solution, the pulverized carbon precursor may be washed to prepare highly quality active carbon free of impurities.

The step of pulverizing a carbon precursor and the step of treating the pulverized carbon precursor with an acidic solution may be performed at ambient temperature and ambient pressure.

Accordingly, the entire process of an exemplary method may be simplified compared to the related art.

Meanwhile, the method of preparing active carbon may include a step of heating the reaction mixture at a temperature of about 800° C. to about 1000° C. in the presence of nitrogen gas.

Since the method of preparing active carbon includes the step of heating the reaction mixture to a temperature of about 800° C. to about 1000° C. in the presence of nitrogen gas, the mixture including the carbon precursor, the alkali salt, and the organic compound including the nitrogen-containing functional group may be simultaneously heated, and thus vaporization of the alkali salt and introduction of the organic compound including a nitrogen-containing functional group may be simultaneously progressed, and thus, high micropore active carbon into which a sufficient amount of the organic compound including the nitrogen-containing functional group is introduced may be prepared by a single-step process.

In the step of heating the reaction mixture to a temperature of about 800° C. to about 1000° C. in the presence of nitrogen gas, by using nitrogen gas ($N_2$), the atmosphere of the tube pipe of a tube furnace where heat treatment is conducted may be made inert, oxygen gas may be removed, and thus oxidation of the carbon precursor and vaporization to carbon dioxide may be prevented.

The pressure of the nitrogen gas may be from about 0.5 atm to about 1.5 atm, or particularly from about 0.8 atm to about 1.2 atm, and although the method of injecting the nitrogen gas is not specifically limited, for example, a method of injecting and discharging at a speed of about 100 cc/min to about 1000 cc/min may be used.

Accordingly, additional vaporized substances that are generated in the synthesis process may be discharged together.

In the step of heating the mixture to a temperature of about 800° C. to about 1000° C., of about 850° C. to about 950° C., or particularly of about 880° C. to about 920° C., when the heat treatment temperature of the mixture is less than about 800° C., the alkali salt may not be sufficiently vaporize, and when the heat treatment temperature is greater than about 1000° C., yield of active carbon may be substantially reduced.

Although a time for heating the mixture to a temperature of about 800° C. to about 1000° C. is not specifically limited, for example, it may be heated for about 30 minutes to about 100 minutes, or particularly for about 60 minutes to about 95 minutes.

The method may further include, before the step of heating the reaction mixture to a temperature of about 800° C. to about 1000° C. in the presence of nitrogen gas, a step of elevating the temperature of the reaction mixture at a rate of about 0.5° C./min to about 10° C./min, or particularly at a rate of about 1.5° C./min to about 3° C./min.

When the rate of temperature elevation is less than about 0.5° C./min, energy consumption may be substantially increased, and when the rate of temperature elevation is greater than about 10° C./min, yield of active carbon may be decreased.

The method for preparing active carbon, if necessary, may further include a step of washing or drying.

The method of washing or drying is not specifically limited, and various methods known in the related technical fields may be used without limitation.

EXAMPLE: PREPARATION OF ACTIVE CARBON

Example 1

At ambient temperature and ambient pressure, zirconia balls having a diameter of about 5 mm and zirconia balls having a diameter of about 10 mm were mixed at a volume ratio of about 3:7 to prepare a zirconia ball mixture. Then, the mixed zirconia balls were mixed with rice husks at a volume ratio of about 100:1, and the mixture was pulverized at about 300 rpm for about 1 hour.

The pulverized rice husks were sequentially washed in a about 5% hydrofluoric acid solution and a about 1 M hydrochloric acid solution, and dried in a vacuum oven.

At ambient temperature and ambient pressure, about 1 g of the dried rice husks and about 2 g of potassium hydroxide (KOH) were put in a about 50 ml aqueous ethanol solution with a volume ratio of ethanol and distilled water of about 1:1, and then, as a nitrogen-containing compound, about 4.495 g (5 ml) of ethylenediamine (EDA) was slowly dripped therein and stirred, and the mixture was heated in a vacuum oven at a temperature of about 60° C.

Thereafter, the mixture of rice husks, potassium hydroxide, and ethylenediamine was put in a tube-type electric heating furnace, the temperature of the mixture was elevated to about 900° C. at a rate of about 2° C./min under a nitrogen gas ($N_2$) atmosphere and maintained for about 90 minutes, and then cooled to room temperature, thus preparing active carbon.

The active carbon was washed with a about 1 M hydrochloric acid solution and distilled water, and completely dried at a temperature of about 120° C. for about 12 hours or greater.

COMPARATIVE EXAMPLES: PREPARATION OF ACTIVE CARBON

Comparative Example 1

Active carbon was prepared by the same method as Example 1, except that non-pulverized rice husk was used, and potassium hydroxide and ethylenediamine were not used.

Comparative Example 2

Active carbon was prepared by the same method as Example 1, except that potassium hydroxide and ethylenediamine were not used.

Comparative Example 3

Active carbon was prepared by the same method as Example 1, except that ethylenediamine was not used.

Experimental Example: Measurement of Physical Properties of Active Carbon Obtained in the Example and Comparative Examples The physical properties of the active carbon obtained in the example and comparative examples were measured as follows, and the results are shown in the following Tables 1 and 2.

1. Specific Surface Area ($m^2/g$)

Each active carbon obtained in Example 1 and Comparative Examples 1 to 3 was deaerated at a temperature of about 200° C. for about 12 hours until remaining pressure became about $10^{-3}$ torr or less.

Thereafter, about 0.1 g of the active carbon was put under a liquid nitrogen atmosphere at about 77 K, and adsorption amount was measured with nitrogen gas as an adsorbate using a BEL-HP (BEL Co.) device.

For adsorption amounts within a range where relative pressure of nitrogen gas (partial pressure/saturated vapor pressure) was about 0.1 to about 0.3, parameters were converted using a Brunauer-Emmett-Teller equation, and then specific surface area was measured using the slope of the straight line, and shown in the following Table 1.

2. Microporosity (%)

About 0.1 g of the active carbon obtained in Example 1 and Comparative Examples 1 to about 3 was put under a liquid nitrogen atmosphere at a temperature of about 77 K, and adsorption amount was measured with nitrogen gas as an adsorbate using a BEL-HP (BEL Co.) device.

Total pore volume was calculated from the adsorption amount when the relative pressure (partial pressure/saturated vapor pressure) was about 0.99, and micropore volume was calculated using a Dubinin-Radushkevich (D-R) equation.

The micropores means pores having a diameter of about 0.5 nm to about 0.8 nm among the total pores, and the total pore volume and micropore volume were used to measure microporosity, which is shown in the following Table 1.

3. Yield (%)

The mass of the rice husks that was dried at a temperature of about 120° C. for about 12 hours, and the mass of the active carbon obtained in Example 1 and Comparative Examples 1 to 3 were respectively measured at a temperature of about 25° C. with TP-214 (Denver Analytical Balance Company) equipment, and yield was measured through the mass variation and shown in the following Table 1.

4. Particle Size Distribution

About 0.01 g of the active carbon obtained in Example 1 and Comparative Example 1 was put in about 100 ml of distilled water, and ultrasonic wave dispersion was conducted for about 5 minutes. The obtained solution was irradiated by a laser ray, generated surface current was measured with a Microtrac (Microtrac Company) device, and parameters were converted to measure particle size distribution, which is shown in FIG. 2.

5. Nitrogen Content (wt %)

For the active carbon obtained in Example 1 and Comparative Examples 1 to 3, nitrogen contents were measured through-ray photoelectron spectroscopy using Al Kα radiation, and are shown in the following Table 2.

6. Mean Carbon Dioxide Adsorption Amount (mg/g)

Each active carbon obtained in Example 1 and Comparative Examples 1 to 3 was deaerated at a temperature of about 200° C. for about 6 hours until remaining pressure became about $10^{-3}$ torr or less.

Thereafter, for about 0.1 g of the active carbon, adsorption amount was measured with carbon dioxide gas as adsorbate at a temperature of about 25° C., at a pressure of about 1 atm, using a BEL-HP (BEL Co.) device.

This process was repeated 5 times to measure mean carbon dioxide adsorption amount, which is shown in the following Table 2.

TABLE 1

Measurement results of physical properties of the active carbon prepared in Example 1 and Comparative Examples 1 to 3

| | Specific surface area ($m^2/g$) | Total pore volume ($cm^3/g$) | Micropore volume ($cm^3/g$) | Microporosity (%) | Yield (%) |
|---|---|---|---|---|---|
| Example 1 | 3420 | 2.105 | 1.598 | 76.0 | 38.7 |
| Comparative Example 1 | 16 | 0.031 | 0 | 0 | — |
| Comparative Example 2 | 56 | 0.075 | 0.010 | 13.3 | — |
| Comparative Example 3 | 2950 | 1.910 | 1.177 | 61.6 | 29.3 |

As shown in Table 1, the active carbon prepared in Example 1 exhibited high microporosity of about 76% and thus exhibited a high specific surface area of about 3420 $m^2/g$, while the active carbon of Comparative Example 1 prepared using only non-pulverized rice husks did not generate micropores, and the active carbon of Comparative Example 2 prepared using only pulverized rice husks exhibited very low microporosity of about 13.3% and a low specific surface area of about 56 $m^2/g$.

Further, the active carbon of Comparative Example 3 prepared by treating pulverized rice husks with potassium hydroxide exhibited microporosity of about 61.6%.

As such, through the decrease in the microporosity of the active carbon of Comparative Examples 1 and 2 that was not treated with potassium hydroxide, the formation of micropores in the active carbon may be increased by the process of treating rice husks with potassium hydroxide.

Comparing Comparative Example 3 that was not treated with ethylenediamine with Example 1, microporosity and specific surface area may increase by the addition of ethylenediamine.

TABLE 2

Measurement results of physical properties of active carbon of Example 1 and Comparative Examples 1 to 3

| | Nitrogen content (wt %) | Mean carbon dioxide adsorption amount (mg/g) |
|---|---|---|
| Example 1 | 4.78 | 24.7 |
| Comparative Example 1 | 0 | 2 |
| Comparative Example 2 | 0.12 | 10 |
| Comparative Example 3 | 2.57 | 19.8 |

As shown in Table 2, the active carbon of Example 1 contained about 4.78 wt % of nitrogen and thus exhibited a higher nitrogen content compared to Comparative Examples 1 to 3.

Further, the mean carbon dioxide adsorption amount of the active carbon of Example 1 was measured as about 24.7 mg/g, which was greater compared to Comparative Examples 1 to 3.

As such, the active carbon of Example 1 may have an increased nitrogen content that can serve as carbon dioxide-philic adsorption sites, and thus may have improved carbon dioxide adsorption capacity.

What is claimed:

1. An active carbon, comprising:
micropores having a diameter of about 0.5 nm to about 0.8 nm in a content of about 70 vol % to about 90 vol % based on the total volume of total pores,
    wherein the nitrogen-containing functional group includes at least one selected from the group consisting of a C1-C20 alkyl group substituted with at least one amino group, a C2-C20 cycloalkyl group substituted with at least one amino group, and a C6-C20 aryl group substituted with at least one amino group,
    wherein the active carbon has a nitrogen-containing functional group introduced on the surface thereof.

2. The active carbon according to claim 1,
    wherein a volume of the total pores is from about 2.000 $cm^3/g$ to about 2.500 $cm^3/g$.

3. The active carbon according to claim 1,
    wherein the active carbon has a diameter of about 0.01 μm to about 0.9 μm.

4. The active carbon according to claim 3,
    wherein the active carbon having a diameter of about 0.1 μm to about 0.5 μm is included in a content of 70 number % to 90 number % of the total number of the active carbon having a diameter of about 0.01 μm to about 0.9 μm.

5. The active carbon according to claim 1,
    wherein the active carbon has a specific surface area of about 3000 $m^2/g$ to about 4000 $m^2/g$.

6. The active carbon according to claim 1,
    wherein the active carbon has a mean carbon dioxide adsorption amount of about 20 mg/g to about 300 mg/g.

7. The active carbon according to claim 1,
    wherein the introduction of the nitrogen-containing functional group on the surface of the active carbon is mediated by at least one functional group selected from the group consisting of a functional group of the following Chemical Formula 1, an ether functional group, and a thioether functional group:

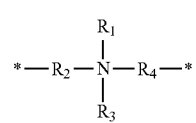

[Chemical Formula 1]

wherein, in Chemical Formula 1,
    $R_1$ and $R_3$ are identical or different, and are independently hydrogen or a linear or branched $C_{1-10}$ alkyl group; and
    $R_2$ and $R_4$ are identical or different, and are independently a bond or a linear or branched $C_{1-10}$ alkylene group.

8. The active carbon according to claim 1,
    wherein the content of the nitrogen in the nitrogen-containing functional group is of about 3 wt % to about 10 wt %, based on the total weight of the active carbon.

9. A method for preparing active carbon, comprising steps of:
    forming a reaction mixture comprising a carbon precursor, an alkali salt, and an organic compound including a nitrogen-containing functional group; and
    heating the reaction mixture to a temperature of about 800° C. to about 1000° C. in the presence of nitrogen gas.

10. The method according to claim 9,
wherein a weight ratio of the alkali salt and the organic compound including a nitrogen-containing functional group is from about 1:1.5 to about 1:5.

11. The method according to claim 9,
wherein a weight ratio of the carbon precursor and the alkali salt is from about 1:1.5 to about 1:2.5.

12. The method according to claim 9,
wherein a weight ratio of the carbon precursor and the organic compound including a nitrogen-containing functional group is from about 1:2 to about 1:10.

13. The method according to claim 9,
wherein the step of forming a reaction mixture is performed at an ambient temperature and an ambient pressure.

14. The method according to claim 9,
wherein the carbon precursor includes at least one selected from the group consisting of rice husks, coconut shells, tangerine peels, orange peels, exhausted coffee, and bamboo stems.

15. The method according to claim 9,
wherein the alkali salt includes at least one selected from the group consisting of potassium hydroxide, sodium hydroxide, and calcium hydroxide.

16. The method according to claim 9, further comprising,
a step of pulverizing the carbon precursor before the step of forming the reaction mixture.

17. The method according to claim 9,
wherein the step of heating the reaction mixture is performed for about 30 minutes to about 100 minutes.

18. An apparatus that comprises an active carbon of claim 1.

19. A resin molded product that comprises an active carbon of claim 1.

* * * * *